No. 668,015. Patented Feb. 12, 1901.
J. MORRISON.
PLUMB RULE AND LEVEL.
(Application filed Sept. 29, 1900.)
(No Model.)

Witnesses
Francis H Anglin
Alex. D. Mabon

Inventor
John Morrison,
By J.W. Harbit
Attorney

THE NORRIS PETERS CO., PHOTO-LITHO., WASHINGTON, D. C.

United States Patent Office.

JOHN MORRISON, OF PITTSBURG, PENNSYLVANIA.

PLUMB RULE AND LEVEL.

SPECIFICATION forming part of Letters Patent No. 668,015, dated February 12, 1901.

Application filed September 29, 1900. Serial No. 31,524. (No model.)

*To all whom it may concern:*

Be it known that I, JOHN MORRISON, a citizen of the United States, residing at Pittsburg, in the county of Allegheny and State of Pennsylvania, have invented new and useful Improvements in Plumb Rules and Levels, of which the following is a specification.

This invention relates to plumb rules and levels, and has particular reference to certain improvements on the plumb rule and level patented to me January 24, 1899, No. 618,254.

The primary object of the invention is to improve the adjustable glass tube case or holder by forming the same of a blank which is shaped as required to constitute an adjustable holder within the plumb or level stock and which may also be used as a pocket-level, also as a level in connection with a straight-edge.

A further object is to improve the construction of the holder with reference to its adjustment in the stock.

The invention consists in the novel features of construction and in the combination of parts hereinafter fully described and claimed, and illustrated by the accompanying drawings, in which—

Figure 1:
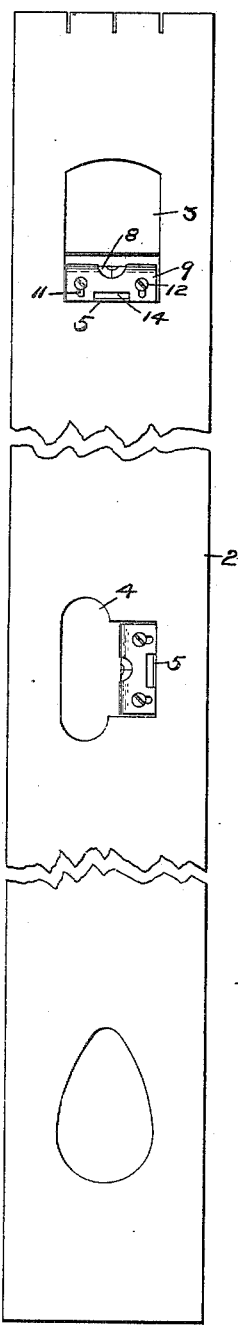
Figure 2:
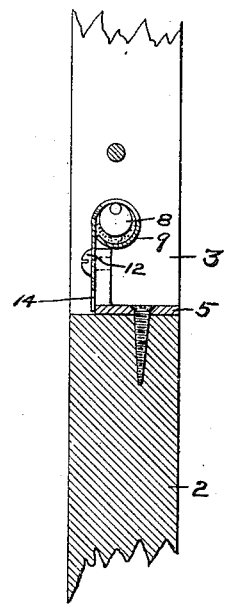
Figure 3:
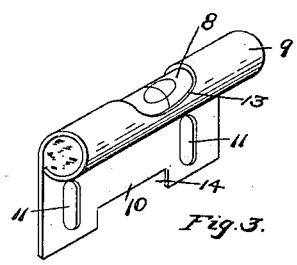
Figure 4:
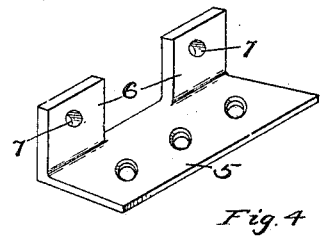
Figure 5:
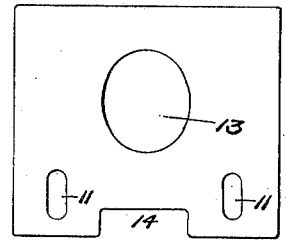
Figure 6:
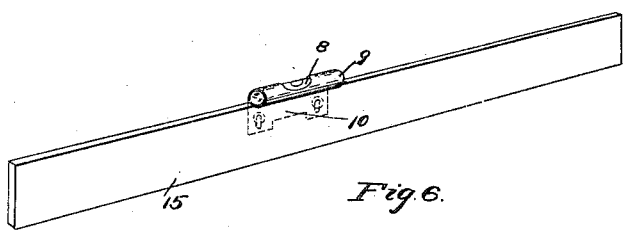

Figure 1 is an elevation of a plumb rule and level embodying my improvements. Fig. 2 is a vertical cross-sectional view of the upper portion of the same. Fig. 3 is a detail view of the case or holder. Fig. 4 is a similar view of the plate to which the holder is adjustably secured. Fig. 5 is a view of the blank from which the holder is formed. Fig. 6 is a view of the holder applied to a straight-edge.

Referring to the drawings, 2 is the plumb rule and level stock, having opening 3 for plumbing and opening 4 for leveling. The level mechanism secured within each of these openings is identical, so that the following description applies to both. Secured in the bottom of each of openings 3 and 4 is a plate 5, having the right-angled projections or ears 6, apertured at 7.

8 is the glass mercury-tube, which is secured in the tubular portion 9 of the holder. Projecting from this tubular portion and corresponding in length thereto is the flat plate portion 10, slotted at 11 to pass securing-screws 12, which enter apertures 7 of ears 6, plate portion 10 lying flatly against the outer sides of the ears, as shown. Tube 9 has aperture 13 to expose the glass tube. The longitudinal edge of plate portion 10, between the lines of slots 11, is notched at 14, so that with either of clamping-screws 12 slackened a screw-driver, nail, or other device may be inserted for moving the holder with relation to plate 5, as when truing the level. By this means also the tube-holder may be so adjusted on the stock as to permit of the implement being used for gaging bevels, inclined surfaces, &c.

The tube-holder is formed of a blank of sheet metal of the shape illustrated in Fig. 5, the blank being of rectangular shape and cut by a stamp or die which at the same time forms opening 13, slots 11, and notch 14.

The glass tube and holder constitute a convenient pocket-level, the longitudinal edge of plate portion 10 being parallel with mercury-tube 8, or the same may be temporarily secured to a straight-edge 15, Fig. 5, being secured in the adjustment necessary for gaging surfaces such as floors, walls, pavements, &c. Instead of being secured to the straight-edge the holder may be held thereon by the operator, as will be understood.

The tube-holder is more durable and capable of easier adjustment than the holder of my former patent and can be manufactured at less cost.

Having thus fully described my invention, what I claim as new, and desire to secure by Letters Patent, is—

1. The combination of a leveling-glass, a holder for the glass, said holder having one longitudinal edge curved upon itself in tubular form to receive said glass, the remainder of the blank, carrying the other longitudinal edge thereof, remaining flat and formed, adjacent its ends, with slots disposed at right angles to said longitudinal edge, and a mounting against which said flat portion of the glass-holder bears and to which it is secured by screws extending thereinto through the said slots, substantially as shown and described.

2. The combination of a stock, a plate 5 secured thereto and formed at the ends with projecting ears, a glass, a holder for the glass, said holder having a laterally-projecting flat portion extending longitudinally of the glass and adapted to rest against the ears, said flat portion of the holder and the ears having corresponding apertures, clamping-screws in the apertures, the free longitudinal edge of the flat portion of the holder being notched as described, whereby with either or both of said clamping-screws slackened the glass-holder may be adjusted on the plate-ears by inserting a screw-driver or other device into said edge notch and over plate 5, as set forth.

3. The combination of a stock, a mercury-tube, a tube-holder having a projecting part extending longitudinally thereof and at right angles to the axis of the tube, securing-points adjacent the ends of the projecting portion for adjustably uniting with the stock, the longitudinal edge of the projecting portion being notched between said securing-points, for the purpose, substantially as shown and described.

4. The tube-holder blank of rectangular outline and formed with circular opening 13 midway between its ends and nearer one longitudinal edge thereof than the other, and elongated notch 14 in the longitudinal edge farthest removed from opening 13, substantially as shown and described.

5. The tube-holder blank of rectangular outline and formed with circular opening 13 midway between its ends and nearer one longitudinal edge thereof than the other, and slots 11 adjacent the ends of the blank and between opening 13 and the longitudinal blank edge farthest removed from said opening, substantially as shown and described.

In testimony whereof I have hereunto set my hand in presence of two subscribing witnesses.

JOHN MORRISON.

Witnesses:
ALEX. S. MABON,
J. M. NESBIT.